United States Patent [19]
Johnson

[11] 3,931,903
[45] Jan. 13, 1976

[54] MOTORCYCLE RACK FOR VEHICLES

[76] Inventor: McVoy Johnson, Star Rte. 2, Box 314, LaPine, Oreg. 97739

[22] Filed: May 3, 1974

[21] Appl. No.: 466,706

[52] U.S. Cl. ............................... 214/450; 214/77 P
[51] Int. Cl.² ............................................. B60R 9/00
[58] Field of Search .... 214/450, 451, 454, DIG. 10, 214/77 P; 224/42.03 B, 42.21, 42.35, 42.44, 42.08, 29 R

[56] References Cited
UNITED STATES PATENTS

| | | | |
|---|---|---|---|
| 3,251,520 | 5/1966 | Van Dyke et al. | 224/42.03 B |
| 3,517,838 | 6/1970 | Lugash | 214/77 P |
| 3,528,578 | 9/1970 | Schoenberger | 214/450 |
| 3,717,271 | 2/1973 | Bargman, Jr. | 214/451 |
| 3,754,672 | 8/1973 | Blomquist et al. | 214/450 |
| 3,805,984 | 4/1974 | Schwarz et al. | 214/450 |

Primary Examiner—Robert J. Spar
Assistant Examiner—Ross Weaver
Attorney, Agent, or Firm—James D. Givnan, Jr.

[57] ABSTRACT

A motorcycle rack including swingable pairs of arms providing a parallelogram linkage carrying at their outer ends a detachable motorcycle support structure. The arms are of irregular configuration for positioning of the support structure in a travel position closely adjacent a vehicle bumper. A base frame is mounted at fore and aft spaced apart points to the vehicle chassis for load distribution purposes.

3 Claims, 5 Drawing Figures

GROUND

MOTORCYCLE RACK FOR VEHICLES

BACKGROUND OF THE INVENTION

The present invention relates to rack structures mounted on vehicles for the purpose of transporting motorcycles or the like.

The transport of a motorcycle by a vehicle is complicated by reason of the fact that a motorcycle is both of substantial weight and size. The rack prior art discloses several arrangements for supporting of a motorcycle adjacent a vehicle bumper. Such racks are positionable for purposes of motorcycle loading and/or to provide access to a vehicle carried camper unit. Examples of such racks are found in U.S. Pat. Nos. 3,366,256; 3,655,082; 3,695,469 and 3,731,830. A rack disclosed in U.S. Pat. No. 3,528,578 is adapted for vertical movement alone. A common requirement of such racks is that they require at least partially lifting of the motorcycle into place on the rack which requires considerable strength in view of typical motorcycle weights being in excess of 200 pounds, as for example, the last mentioned patent calls for the use of an automobile jack to lift the motorcycle and rack into an elevated position for travel.

The prior art racks, in addition to requiring considerable physical effort, do not lend themselves to loading and transport of more than one motorcycle in a rapid and convenient manner.

A further problem encountered with existing motorcycle racks is that they preclude, for the most part, the mounting and use of trailer hitches subjacent the rearward bumper of the vehicle.

SUMMARY OF THE INVENTION

The present invention is embodied within a motorcycle rack mounted either forwardly or rearwardly adjacent a vehicle bumper with the rack including a parallelogram linkage for the horizontal support of a motorcycle receiving member or members. Said member remains in parallel relationship to the ground surface at all times to facilitate wheeling of the motorcycle both into place and off the rack member. Said linkage is carried by a stationary base frame coupled to the vehicle frame at spaced apart attachment points very advantageous for distributing rack and motorcycle weights forwardly along the vehicle frame. In view of the present motorcycle rack being capable of supporting one or more motorcycles this feature is considered to be highly advantageous.

The present rack, in one form, embodies a trailer hitch component permitting the towing of a trailer by a rack equipped vehicle.

A still further objective of the invention is the racks adaptability for use as a step support facilitating entry and exit from a truck carried camper structure.

An additionally important objective of the present rack is the provision for convenient detachment of certain rack members when the rack is not being used to reduce the overall length of the vehicle and rack for purposes of vehicle maneuverability.

Another important objective is the utilization of a parallelogram linkage having irregular shaped pairs of arms which permit the rack to swing into close proximity with a vehicle bumper to minimize the overall length increase to the supporting vehicle. Additionally, adequate road clearance is maintained which is of particular importance in vehicles used off of paved roadways where steep inclines may be encountered.

DESCRIPTION OF THE PREFERRED EMBODIMENTS

Figure 1:
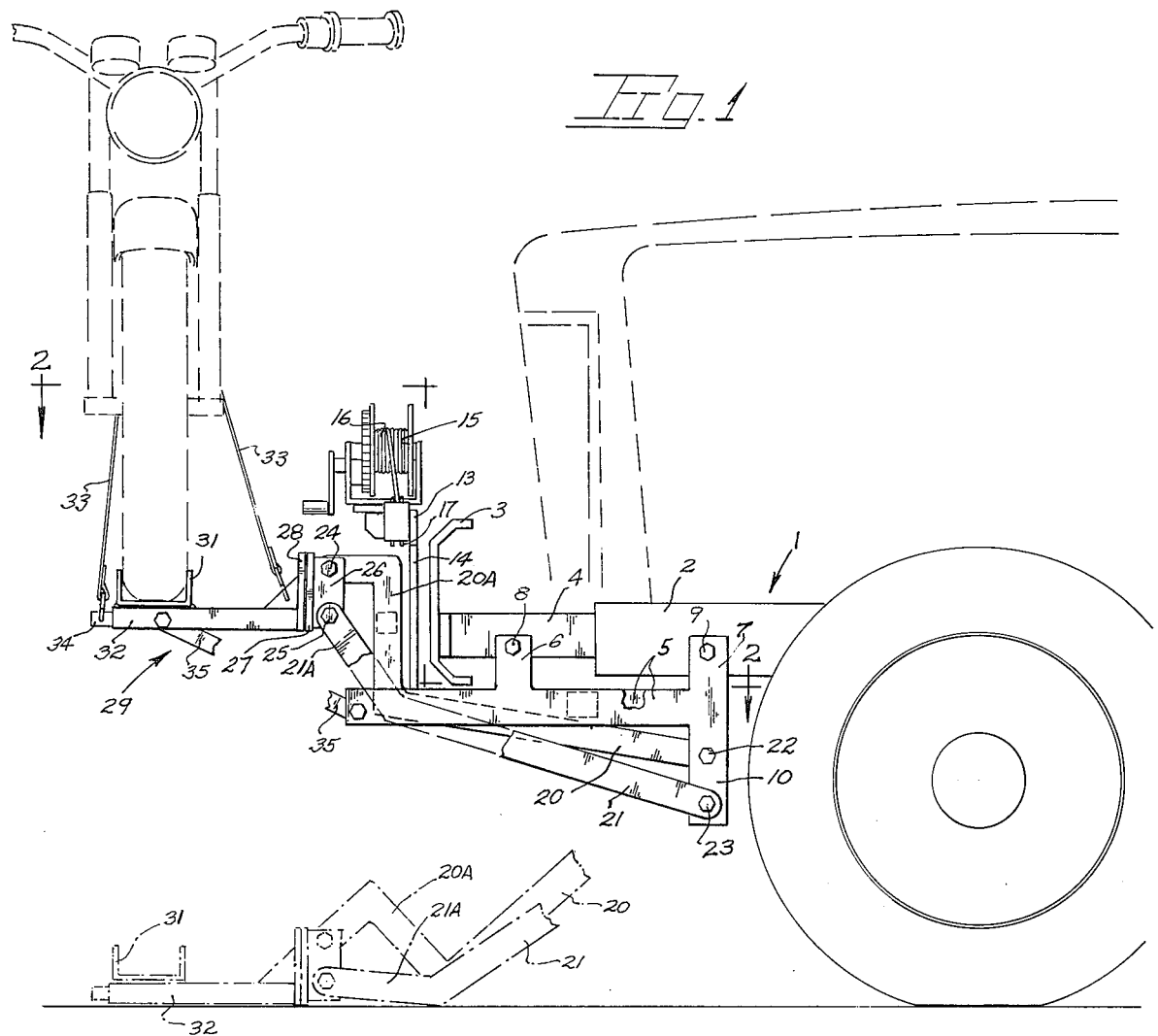
FIG. 1 is a side elevational view of the present rack.
Figure 2:
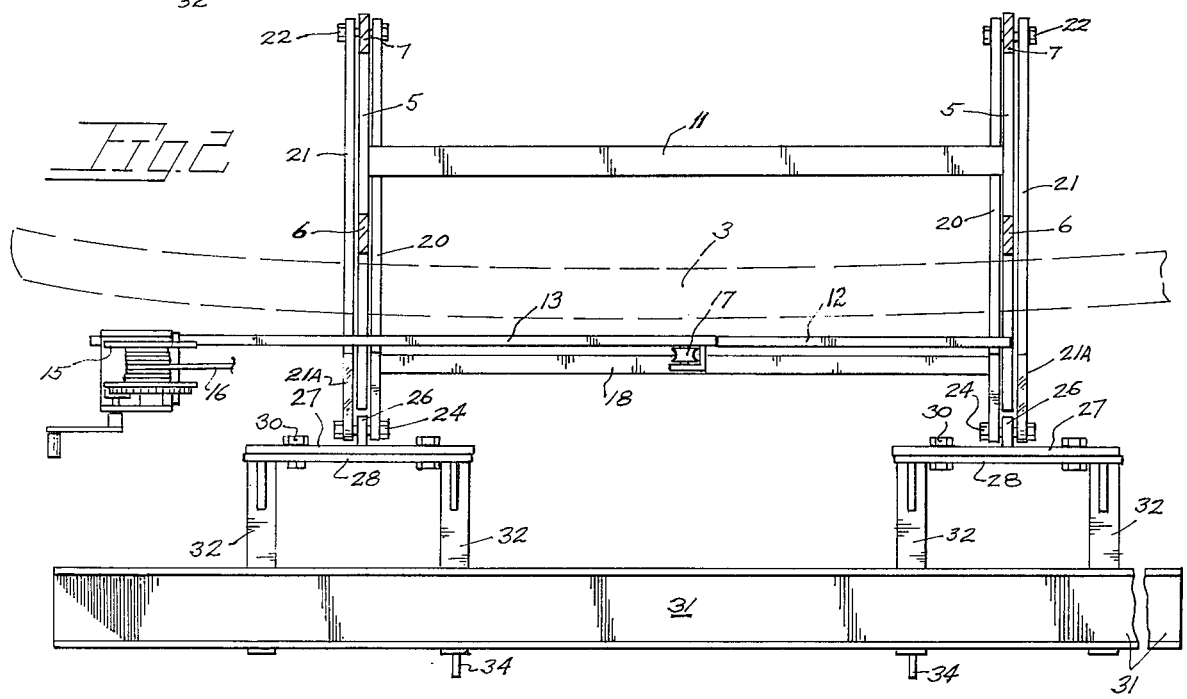
FIG. 2 is a plan view of the rack taken along line 2—2 of FIG. 1.

In the accompanying drawings wherein applied reference numerals indicate parts similarly identified in the following specification, the reference numeral 1 indicates generally a vehicle chassis consisting of longitudinal frame members 2 serving to support a bumper 3 by means of brackets 4 all in the conventional manner. While disclosed in FIG. 1 as being supported adjacent the front bumper of a vehicle it is to be understood that the present rack is equally adaptable to mounting adjacent the rearward end of vehicle frame 2.

A base frame of the motorcycle rack comprises parallel rails 5 each being secured to the vehicle by means of upwardly directed projections 6 and 7 in suitable vehicle securement at 8 and 9. Such fore and aft attachment may be along the vehicle frame 2 or with the frame and bumper bracket 4 as shown. Accordingly each rail 5 projects lengthwise from the end of the vehicle frame in parallel relationship to vehicle frame members 2 and attached thereto at fore and aft spaced points for optimum load disposition. Preferably a crossmember 11 is provided intermediate the rails 5 to reinforce same against bending loads. Downward extensions 10 of the base frame are aperatured for pivotal attachment with later described pairs of arms.

Winch support structure is integral with said stationary frame and includes a transverse bar 12 on which a horizontal winch support 13 is carried by spacers 14. The winch at 15 is offset to one side of the rack and is of the conventional type including a locking mechanism automatically retaining the winch drum against rotation resulting from loads applied to a winch cable 16. Said cable is directed through a fixed pulley wheel 17 and thence downwardly about a movable pulley wheel carried by later described parallelogram linkage, the cable terminating in upward securement adjacent the stationary pulley wheel 17.

The above described base frame, in addition to supporting winch 15, swingably carries a parallelogram linkage having upper and lower pairs of arms 20 and 21 each having upwardly directed segments 20A, 21A. Said arms are pivotally mounted at 22, 23 at their innermost ends to downward extension 10 of the base frame. The upper and lower pairs of arms at each side of the base frame are mounted oppositely on their respective extensions 10 and at their upper limits of travel are also spaced by the forward ends of the base frame rails 5. Extending crosswise between arm segments 20A is a crosspiece 18 having a pulley 19 through which cable 16 passes for imparting lifting motion to the arms.

The forward ends of each of the arms 20 and 21 terminate in pivoted attachment at 24, 25 to ears 26 each integral with a rectangular plate 27 supporting a motorcycle support structure generally at 29. Mounted in a detachable manner to each of the plates 27 is a correspondingly shaped plate 28 with both of said plates having aligned openings therein for the reception of bolt assemblies 30. A motorcycle support member 31, disclosed as an elongate channel iron, is carried by multiple inverted channels 32 of lesser size with the channel 31, channels 32 and plates 28 being a weldment and being removable upon removal of fasteners 30 to permit the substitution of a like weldment having plural motorcycle support members at 31' as viewed in FIG. 3A. Additionally important, the present rack by having the detachable support assembly 29, permits a reduction of the distance the rack protrudes outwardly from a bumper. Detachment of the weldment from plates 27 substantially reduces the distance with the plates 27 thereafter functioning as an auxiliary bumper surface. By reason of the novel configuration of the parallelogram arms 20 and 21, the plates 27 when in the raised travel position add approximately only six inches to the overall vehicle length. With somewhat more difficulty the entire rack may be detached from the vehicle by removal of mounting bolts 8 and 9 from each rail 5.

For securement of the motorcycle upon channel member 31 hook equipped straps 33 are attached about the motorcycle frame and to clips 34 welded to the channel member 31.

The operation of the present rack is believed to be obvious from the foregoing description. Loading is achieved by simply wheeling of the motorcycle (or motorcycles) into place on channel member (or members) 31 whereupon winch 15 is operated to elevate the rack to the full line position of FIG. 1 for travel. A locking bar 35 extends between the forward end of rail 5 and one of the inverted channels 32 to positively lock the rack in the raised position thereby supplementing the rachet-type lock on the winch.

Figure 3:
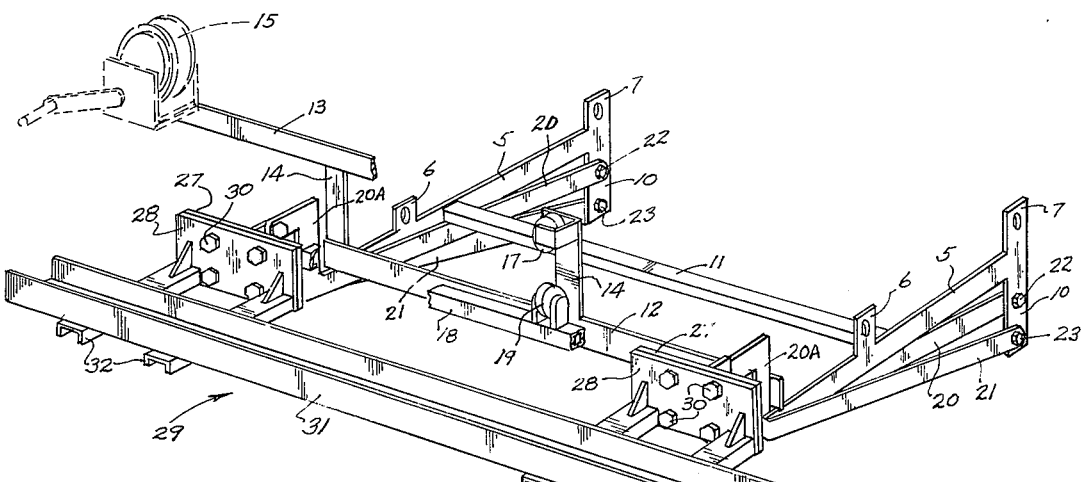
FIG. 3 is a perspective of the rack removed from a supporting vehicle.
Figure 3A:
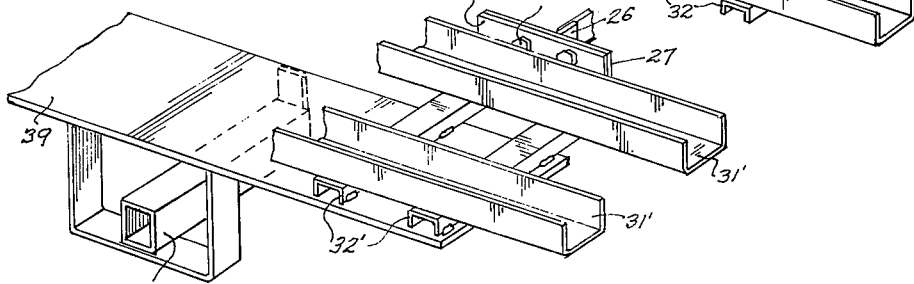
FIG. 3A is a fragmentary perspective view of a modified motorcycle support for transporting two motorcycles.

In FIG. 3A I show a slightly modified arrangement interchangeable with that earlier described by removal of fasteners 30. Multiple elongate channels at 31' are in welded securement to support members 32' with plates 28' being removably attached to the correspondingly sized plates 27. A further variation resides in a trailer hitch socket component 38 depending from a plate 39 carried by the supports 32'.

Figure 4:
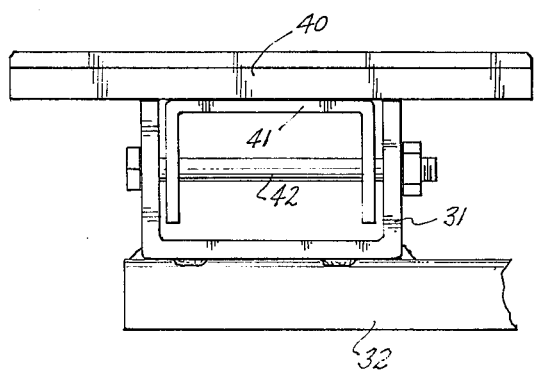
FIG. 4 is a side elevational view of a step in bolted attachment with a channel iron rack member.

In FIG. 4 a step 40 is shown in place on a channel member 31 with a bolt assembly 42 extending through a channel segment 41 mounted on the step underside. When the rack is empty the channel 31 may be elevated by operation of winch 15 and the step 40 mounted thereon to provide convenient access to a truck mounted camper unit which normally requires some type of auxiliary step for convenient access.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A motorcycle rack for attachment to the frame members of a supporting vehicle in a load distributing manner, said rack comprising in combination,
    a base frame including a pair of spaced parallel rails supported at fore and aft spaced apart points by the vehicle frame to impart loads to the frame at points therealong, said rails including upwardly directed projections for frame attachment purposes,
    upper and lower pairs of arms located at each side of the base frame each of said arms pivotally mounted at its innermost end to said base frame below the vehicle frame and adapted for travel along a vertical path to constitute a parallelogram linkage, each upper and lower pair of arms at each side of the base frame terminating outwardly in pivotal attachment to a plate member with a transverse face,
    a motorcycle support structure located forwardly adjacent a vehicle bumper in its raised travel position and including elongate means for the reception of motorcycle wheels,
    means for imparting a lifting force to the motorcycle support structure, and
    said motorcycle support structure including a pair of transverse plate members each in juxtaposition with the first mentioned plate members, means readily detachably mounting the plate members of the motorcycle support structure to the first mentioned plate members whereby said motorcycle support structure may be easily attached to and detached from said first mentioned plate members, such that when the rack is not being used to support a motorcycle, the resulting combined length of the vehicle and motorcycle rack with the motorcycle support structure removed, is only slightly greater than the vehicle length alone.

2. The motorcycle rack claimed in claim 1 wherein the detachably mounted plate members of the motorcycle support structure permit substitution of a second motorcycle support structure having multiple elongate means for the support of two or more motorcycles.

3. The motorcycle rack claimed in claim 1 additionally including a step structure including means depending therefrom in detachable engagement with the elongate means of the motorcycle support structure.

* * * * *